F. W. EDWARDS.
SIGHT FEED CONDENSATION DISPLACEMENT LUBRICATOR.
APPLICATION FILED AUG. 24, 1908.
1,032,662.
Patented July 16, 1912.
4 SHEETS—SHEET 3.
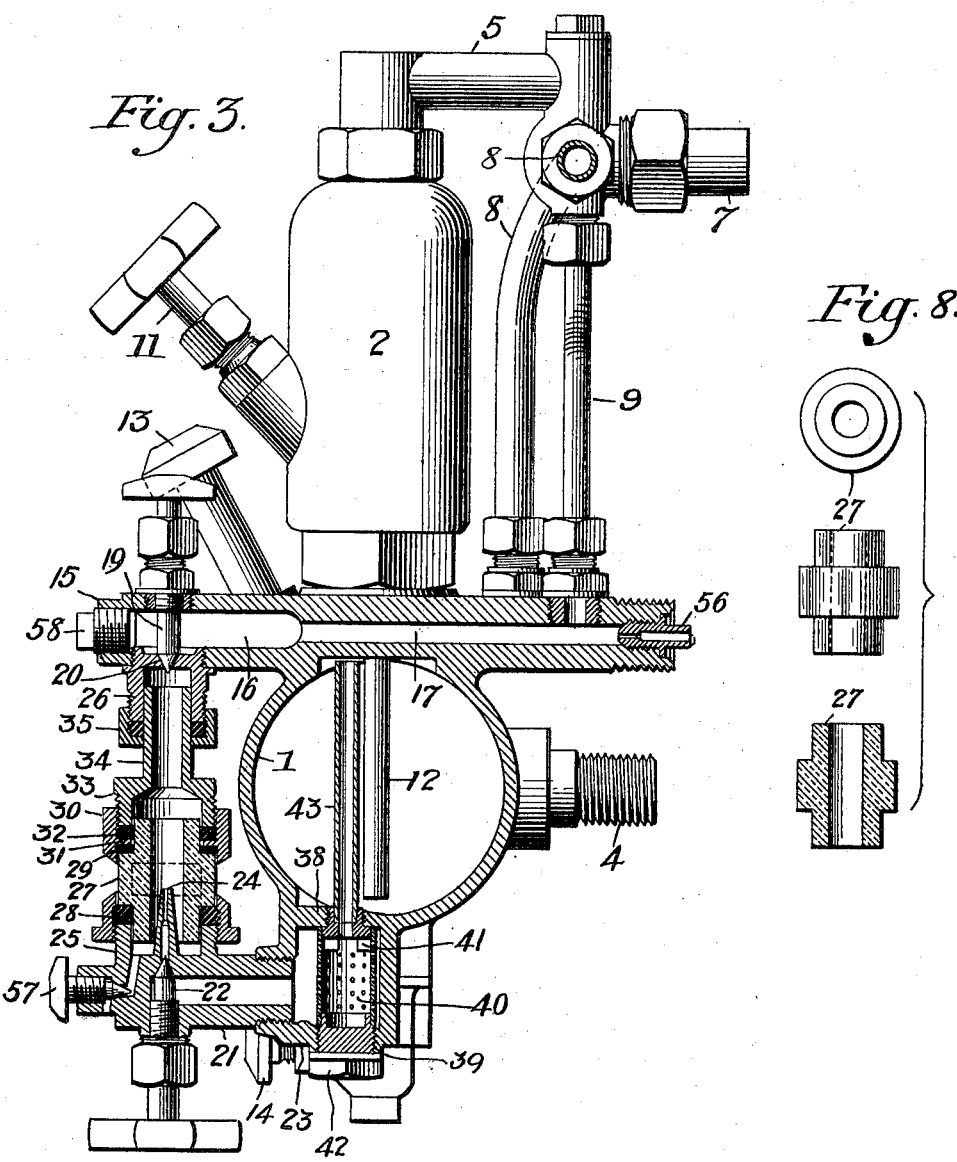

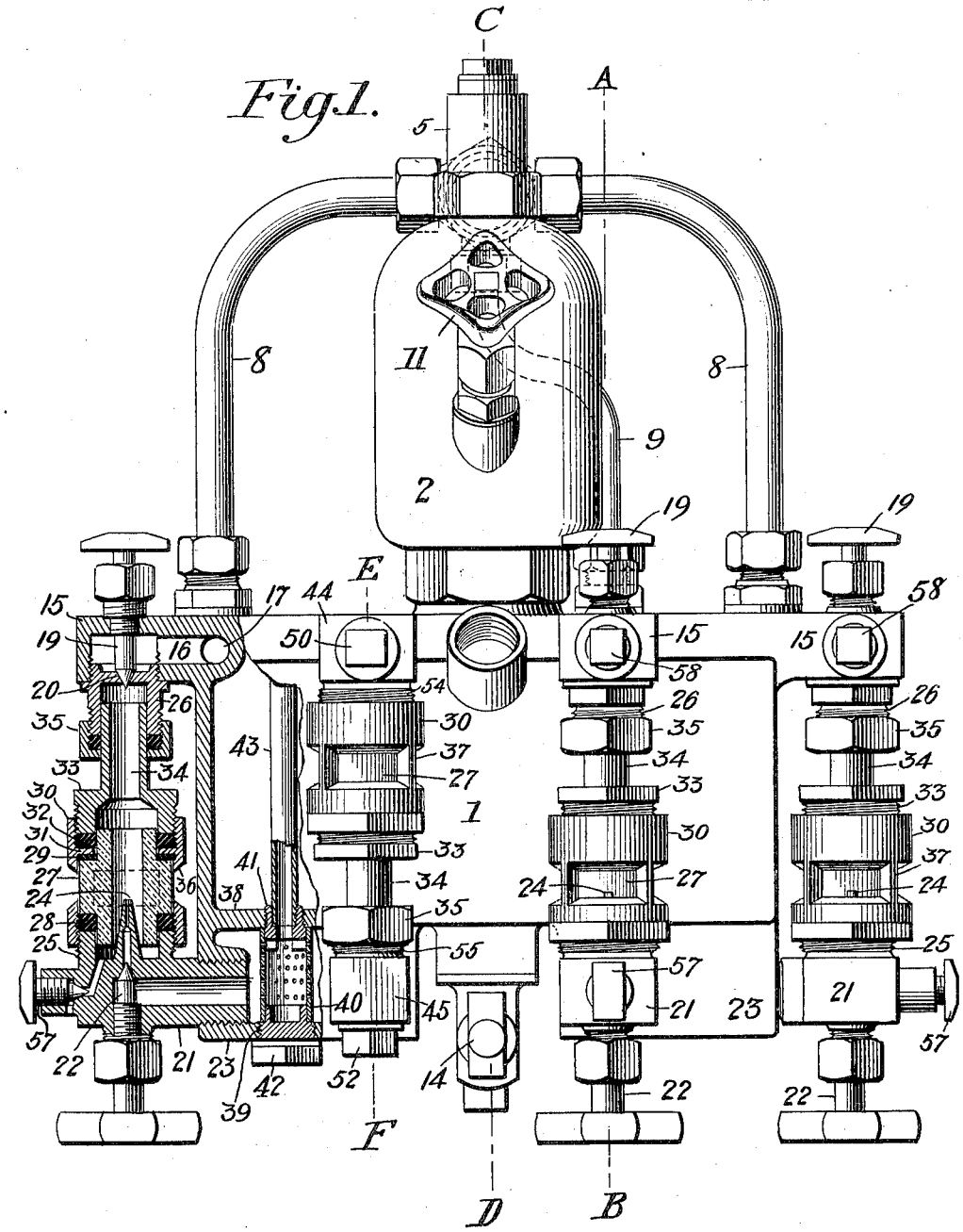

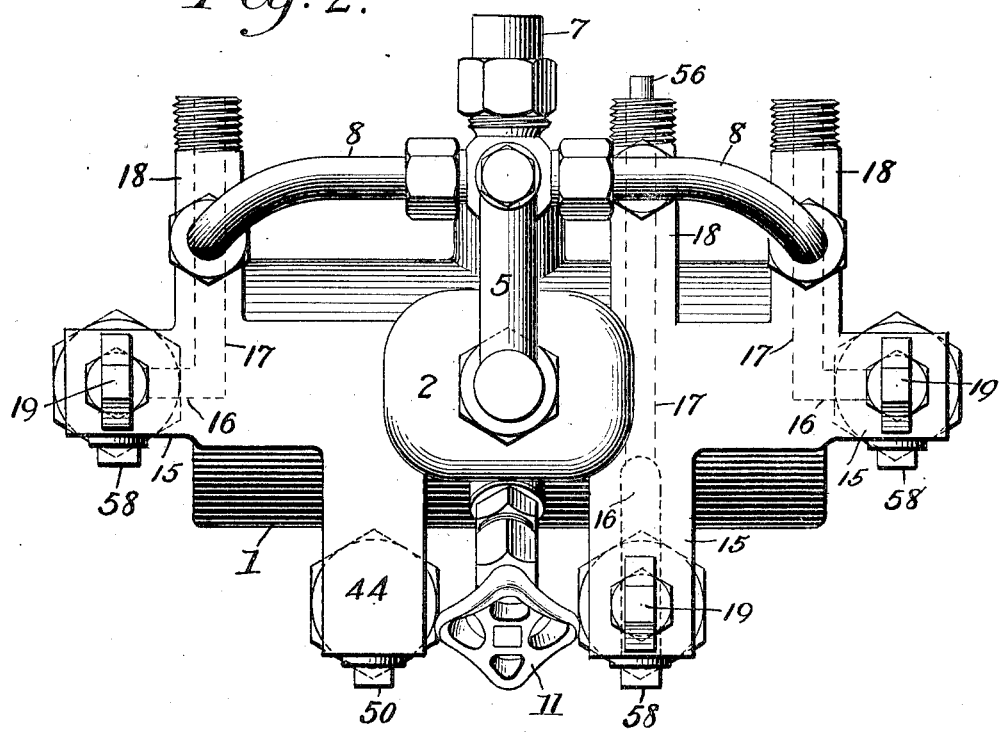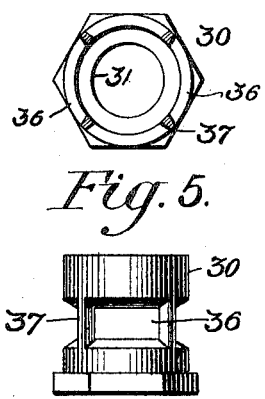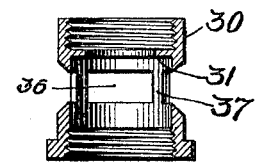

F. W. EDWARDS.
SIGHT FEED CONDENSATION DISPLACEMENT LUBRICATOR.
APPLICATION FILED AUG. 24, 1908.
1,032,662.
Patented July 16, 1912.
4 SHEETS—SHEET 4.
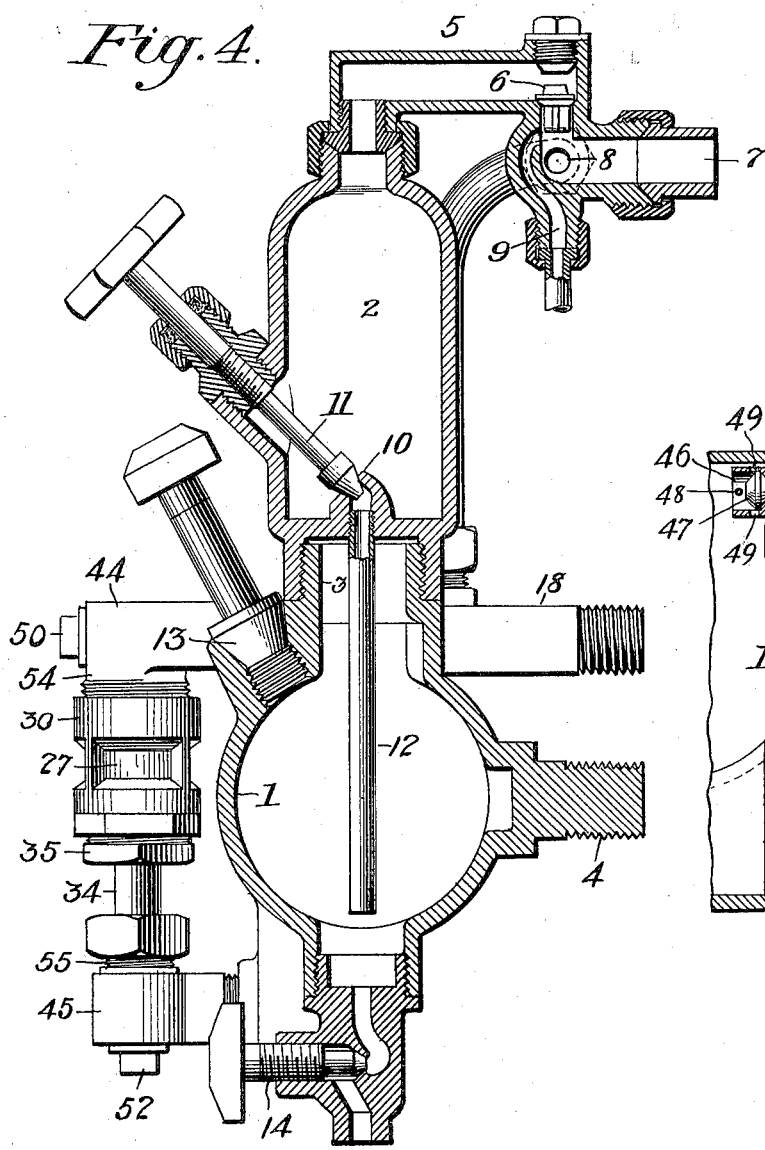
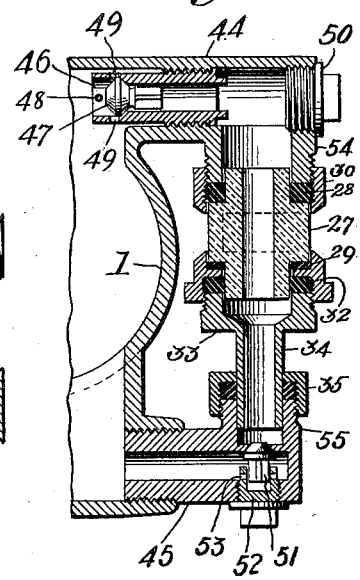
Witnesses:
D. W. Edelin
Lillie M. Perry.
Inventor:
Frank W. Edwards
by Wm. H. Finckel
Atty.

UNITED STATES PATENT OFFICE.

FRANK W. EDWARDS, OF LOGANSPORT, INDIANA, ASSIGNOR TO THE CHICAGO LUBRICATOR COMPANY, OF CHICAGO, ILLINOIS, A CORPORATION OF ILLINOIS.

SIGHT-FEED CONDENSATION DISPLACEMENT-LUBRICATOR.

1,032,662.      Specification of Letters Patent.      Patented July 16, 1912.

Application filed August 24, 1908. Serial No. 450,096.

*To all whom it may concern:*

Be it known that I, FRANK W. EDWARDS, a citizen of the United States, residing at Logansport, in the county of Cass and State of Indiana, have invented a certain new and useful Improvement in Sight-Feed Condensation Displacement-Lubricators, of which the following is a full, clear, and exact description.

An essential requirement in a sight-feed lubricator is that it shall permit such observations of the feed that the operator may determine whether the lubricator is feeding with the required regularity. To this end sight-feed lubricators have always been constructed with sight-feed chambers through which the oil passes drop by drop, the whole or some portion of the walls of these chambers being of glass. These glasses are usually called "observation glasses," and have been of two general types. In one of these types the glass is in the form of a cylinder or tube of uniform diameter and having walls of uniform thickness, the oil passing through the tube or cylinder. It is highly important that the sight-feed chamber should be so located as to be readily observable from various points of view about the lubricator, and more important still that its interior should be subjected to light and that its interior should be illuminated by the light coming from various directions and passing through the transparent walls of the chamber. This facility of observation has been secured in the old well-known tubular glass which is held at its ends in supporting arms usually provided with packing. While this form of glass was ideal in that it was so placed that feed of oil could be observed from various positions, and also in that it permitted the light to enter the chamber from various directions thus affording perfect illumination on the lubricator, yet it has certain inherent and radical defects which have never been overcome and for which heretofore no remedy has been proposed. These defects arose from the frequent breakage due to the fragile character of the tube itself, no such glass having been heretofore constructed of sufficient strength to withstand the internal steam pressures and the strains due to the variation of temperature and the getting out of line of the mountings. These glasses frequently broke, thus putting the lubricator out of service, and the danger from flying particles of glass was so serious as to cause the use of wire guards around the glasses, thus adding to the expense and interfering with ready observation. The other type of glasses is known as the bull's eye. These glasses are invariably mounted in pockets, usually of metal, and fitted into the side walls of the sight feed chambers. These glasses are solid and their length is usually greater than the diameter. The pockets or chambers containing the glasses are usually arranged in pairs, being placed in line with each other on opposite sides of the sight-feed chamber. These glasses largely overcome the liability of breakage, but they do not afford ready observation from different points, having, in fact, only small areas exposed to the light, and being for the most part surrounded by solid walls; and they cannot always be so placed as to permit the light to enter through both glasses or from opposite sides of the chamber. Further, these glasses are so thick and their exposed areas so limited that they do not afford good illumination, and with turbid water the feed of the oil cannot be observed readily. These objections are so pronounced that it is generally recognized that the bull's eye type of glass affords less facility for correct observation of the feed of the oil than the tubular glass, but these bull's eyes have been and are used because of their avoidance of the objections to tubular glasses above stated.

The object of my invention is to secure all of the advantages without the defects of both forms of glasses above mentioned, and to insure complete illumination and perfect observation, together with necessary strength and safety.

My invention, therefore, consists principally in an observation glass for lubricators, having a central passage through which the oil feeds, the exposed portion of such glass being of such strength as to withstand all ordinary pressures, strains and shocks, and having its ends so shaped as to adapt it to be suitably supported and to receive suitable packing.

In the preferred form, my improved observation glass has a thick central portion, terminal portions arranged for packing and preferably of a different diameter from the central portion, and a central passage for the oil, the glass constituting in and of itself a sight-feed chamber. The provision of the thick central portion is, in effect, a reinforcement of the glass, and by the term "reinforced observation glass" herein used I mean to include any and all of a great variety of such glasses as disclosed in this and other cases Serial Nos. 450,093, 450,094 and 450,095 (now patents numbered 952,611, 952,515, and 1,009,290, respectively).

My observation glass may be made in a great variety of forms and it may be combined with various mounting means and forms of packing.

My invention further consists in various novel features of construction of the glass and the means for mounting the same, and in various combinations of the glass with its mountings and packing all as hereinafter described and pointed out in the claims.

In the accompanying drawings, illustrating the invention, in the several figures of which like parts are similarly designated, Figure 1 is a front elevation of an approved form of sight-feed condensation displacement lubricator with the left-hand feed and adjacent parts in vertical section. Fig. 2 is a top plan view. Fig. 3 is a vertical section taken substantially in the plane of line A B, Fig. 1, with the condenser in elevation. Fig. 4 is a vertical section taken substantially in the plane of line C D, Fig. 1. Figs. 5, 6 and 7 show in elevation, cross-section and longitudinal section, respectively, the packing-case for the glasses. Fig. 8 shows in end view, side elevation and longitudinal section the preferred form of the tubular observation-glass. Fig. 9 is a vertical section taken substantially in the plane of line E F, Fig. 1, and showing the details of the index-glass.

For illustration and without thereby limiting the invention, I have shown a horizontally arranged cylindrical oil-bowl 1, upon which is arranged a condenser 2, which may be cast with the oil-bowl or applied thereto upon a screw-threaded nipple 3, (Fig. 4). The oil-bowl is provided with an attaching lug 4 which may be cast integral therewith. The condenser is provided with a casting 5 containing a check-valve 6, a boiler connection 7 and outlets to steam distributing pipes 8 and 9 which communicate with passages from the upper feed-arms leading, for example, to the two engines and to the air-brake pump. The condenser is provided with a valve-opening 10 controlled by the valve 11, and entering the pipe 12 which extends to the bottom of the oil-bowl or the lowest available point therein to supply the necessary water of condensation.

The oil-bowl is provided with a filler-valve 13 and a drain-valve 14.

All of the parts hereinabove described are of preferred construction, but may be varied within the scope of the invention.

At the top of the oil-bowl and cast therewith are any number of upper feed-arms, 15, one being shown at each end and another in front. Each arm has an internal passage 16 which communicates with the internal passage 17 of its appropriate oil pipe connection 18. Each arm has a valve 19 to control the passage 20 from the sight-feed, and when this valve is opened the outflow of oil progresses and the steam or water of condensation can pass freely from the pipes 8 and 9 through passages 16 and 17 into the sight-feed. This valve 19 may be used to close the passage 20 should there occur any disarrangement or rupture of parts of the sight-feed. Below and in line with the upper feed-arms 15 are the lower feed-arms 21, which are provided with valves 22 to regulate the feed of oil. These feed-arms 21 are screw-tapped in pockets 23 depending from the oil-bowl, as will be described in detail presently. Opposite the valve 22 is a feed-tip 24, and surrounding the feed-tip 24 is a packing-hub 25. Opposite the valve 19 and depending from the upper feed-arm is a packing-hub 26 screwed into the upper feed-arm, and between these hubs is arranged the sight-feed. As shown in Figs. 1, 3, and 8, the sight-feed comprises an observation glass 27 of two diameters, the large diameter being midway of its length. This glass has its lower smaller diameter inserted within but not in contact with the hub 25, with a packing-ring or gasket 28 interposed between the edge of said hub and the side and the shoulder of the observation glass, and then another packing-ring or gasket 29 is laid upon the upper shoulder and then a metallic packing-case 30 is slipped down over the observation glass and its lower end screwed onto the hub 25 until sufficient tension is put upon the gasket 28 to make a steam, oil, and water-tight joint. This case 30 has an internal flange 31 which presses upon the gasket 29, and upon the top of this flange 31 is arranged another packing-ring or gasket 32 and then a packing-nut 33 is turned into the screwthreaded upper end of the case 30, without contact with the glass, until sufficient tension is put upon the gasket 32 to insure a steam, oil, and water-tight joint. This nut 33 has a tubular extension 34 which enters the hub 26 and any suitable steam-tight joint or packed joint 35 is used to connect the tubular extension and said hub in a tight manner. The case 30 has four, more or less, sight openings 36 arranged in it in line with the thicker portion of the glass, and these sight openings are as large as possible consistent with leaving enough metal 37 between them to make the case strong enough to aid the glass in resisting internal pressure and to protect the glass from external violence.

By the construction of observation-glass shown and just described, the strength of the bull's-eye is obtained in the exposed portion of greater diameter, and the shouldering of the glass affords lodging places for packing whereby the tightness of the packed joint is most efficiently secured. There are thus embodied in this form of glass all of the advantages of the old tubular glass in so far as facilities for watching the feed are concerned, and all of the strength of the bull's-eye for resistance to external violence, and at the same time the glass has strength superior to the tubular glass for the resistance to internal pressure, and it is lighted up from as many as four different points, so as to insure visibility of the oil-feed.

The pockets 23 extend from the bottom of the oil-bowl, and preferably are integral therewith and separated therefrom by partitions 38. The pockets and their parts are alike for the several sight-feeds, and hence only one need be described. A hole 39 is arranged in the bottom of the pocket for the insertion within the pocket of a strainer 40 made of foraminous or other metal whose holes are no larger than the bore of the oil feed-tip. This strainer engages a plug 41 in the partition and is supported by a plug or cap 42 in the lower hole. The plug 41 also supports the oil-delivery pipe 43 which extends up into the oil-bowl as high as necessary. By the use of the strainer no sediment or other impurity large enough to clog the oil feed-tip can escape to such tip.

The various sight-feeds, including the intermediate air-pump sight-feed, may be of a construction similar to that just described, and they are so shown and their various parts similarly designated.

The index-glass is shown at the left of the center in Fig. 1, and shown in elevation in Fig. 4, and in longitudinal section in Fig. 9. The details are the same as in the oil-feed just described, excepting that the parts are inverted and arranged between an upper arm 44 and a lower supporting arm 45 arranged respectively in communication with the top and bottom of the oil-bowl. The lower arm 45, however, unlike the pockets 23 is not separated from the oil-bowl by a partition, but opens directly into it. In the arm 44 is a check-valve case 46 and a check-valve 47 seated in the inner reamed-out end thereof, with a detaining-pin 48. The case 46 is provided with the holes or ports 49 adjacent to the valve-seat, which admit pressure to the check-valve and cause the pressure to equalize when the oil-bowl is full of oil or full of oil and water. The arm 44 is provided with a screw-cap 50.

The arm 45 is provided with a check-valve 51 arranged in a vertically disposed combination cap nut, guide and pocket 52, having clearance ports 53. These clearance ports enable the oil and water to circulate around the bottom of the check-valve and such circulation permits the valve to equalize when the oil-bowl is full of oil, and also admits pressure under the valve to seat it in case of the blowing out of the gasket in the index-glass.

In using that form of the invention where the hub 26 is screwed into the upper feed-arm and the packing-nut 33 is in place in the hub, the packing-case 30 containing the gasket 29, glass 27 and gasket 28, may be screwed onto the hub 25, and then the gasket 32 is put in place and the packing-nut 33 is screwed into the top of the packing-case. The parts are thus held in position.

In all of the various forms of sight-feeds, one of the important features prevailing is the alinement of the glass within its metallic container, and so packing it as to make tight joints and yet permit the inevitable expansion and contraction due to variations in temperature without endangering the glass.

The hub 54 depending from the upper arm 44 may be made integral therewith, and the hub 55 on the lower supporting arm 45 may also be made integral with said arm 45. The relation of the tubular portion 34 of the packing nut to its adjacent hub is such as to permit of this packing nut being unscrewed from the packing-case and moved into the adjacent hub sufficiently far to clear the packing-case and to permit the packing-case to be unscrewed from the other hub, and thus the glass may be lifted out and it or another put into place within the sight-feed. The glass also serves as a sight feed chamber.

The packing-rings or gaskets form cushions between the glass and the metal and thus serve to protect the glass from being chipped or crushed when the metal expands, and yet they are of sufficient elasticity to yield under contraction and maintain tight joints. A choke-plug 56 is shown applied in the air-pump oil-pipe, and similar choke-plugs may be applied to all of the oil-pipe connections, or may be omitted from any one or more of them as may be found necessary in actual service. Each of the sight-feeds may have a drainage passage controlled by a drainage-valve 57. Each of the sight-feeds is shown with a plug 58, and the object of this is to permit of the attachment of an auxiliary oil-cup in case of any derangement of the operation of any one of the sight-feeds.

In the operation of the lubricator, steam is admitted from the boiler through connection 7, thence into the equalizing pipes leading to the various oil feed-pipes and thence into the sight-feed glasses, where it is condensed. Of course, steam also flows into the condenser and is condensed. After condensation is fully formed, and the oil-bowl has been filled with oil, the lubricator valve 19 is opened and the condenser valve 11 is also opened and water of condensation flows through the pipe 12 into the bottom of the oil-bowl and raises the oil to the top of the oil-bowl, from which point it overflows into the oil-delivery pipe 43 and passes down through the strainer 40 into the surrounding pocket, and from each pocket the oil passes to each feed-arm 21 past the valve 22 and thence to the feed-tip 24, and so on up through the sight-feed glass to the place of distribution. To each drop of oil fed out through the oil feed-tip, a drop of water is admitted into the bottom of the oil-bowl to take the place of the oil.

By the construction described for supplying oil from the oil-bowl to the various lower feed-arms, I am able to dispense with the bent oil pipe heretofore common, and which bent pipe was liable to be broken off and the injury not discovered until the lubricator was under test. In the case of the index-glass, the check-valves 47 and 51 at the top and bottom are in fact safety check-valves, which automatically seat in the case of a gasket being blown out, and thus preserve the integrity of the lubricator. The lower check-valve 51 is shown in a vertical position so that in case of the draining of the oil-bowl, said valve will drop from its seat and permit the contents of the index-glass to drain out at the oil-bowl drain, and then when refilling the oil-bowl, the valve is so arranged in this vertical position that the mere blow of the oil will not raise the valve to its seat and thus prevent the oil from filling into the index-glass at the same time that it fills into the oil-bowl. In other words, the fact that the valve remains away from its seat during this filling operation insures the flowing of the oil into the index-glass at the same time that it flows into the oil-bowl. The other check-valve 47 is arranged in a horizontal position so that the equalizing pressure coming up through the sight-feed glass does not have the weight of the valve against it, but merely has to equalize against the check-valve as it is floated from its seat under the pressure within the bowl and the index-glass and its connections, thus making a perfect balance at all times between the two check-valves and also affording an arrangement whereby the pressures will act directly against the check-valves to seat them in case of an escape of pressure within the index-glass packing or any part of the connections.

Various movable and removable parts of the lubricator are shown as provided with hexagonal or other angular portions by which they may be engaged by a wrench.

The various forms of sight-feed glasses are constructed with special attention to light exposures and to the packing of the glass in its metallic case in order to insure a perfect seal of the glass on the feed-arm and the packing-nut, and at the same time permit free expansion in any direction and yet retain a tight joint.

The glass may be given a variety of forms and by means of suitable packing-rings or gaskets be secured within packing-cases having some or all of the characteristics of the packing-case described.

This invention is not limited to any special form of openings in the sides of the packing-case, since the glass may be mounted in a variety of ways and by a variety of means, some of which are indicated in the co-pending cases referred to. As shown in case Serial No. 450,095 it is possible to so mount the glass as to expose it unobstructedly entirely around its central portion. Moreover, while the invention is shown in connection with a condensation displacement lubricator, the glass might be used with other forms of lubricators.

What I claim is:—

1. A lubricator observation-glass, tubular in form to provide for the passage through it of the lubricant and of great thickness to provide strength to resist pressure and blows, the greatest thickness being arranged about midway of its length and where the glass is exposed, and its ends reduced and shouldered to provide seats which of themselves are adapted to receive and retain packing-rings, combined with a packing-case, a support for the packing-case, and a packing-nut engaging the packing-case and packing-rings.

2. In a lubricator, a sight-feed comprising a glass having a longitudinal oil passage and its center and ends of different diameters, the center being larger and the reduced ends forming shoulders with the center, a packing-case having an internal flange near one end, and packing-rings interposed on opposite sides of the said flange and between it and the shouldered glass, and a packing-ring on which the glass is seated.

3. In a lubricator, a sight-feed, comprising an observation-glass provided with a longitudinal oil-passage and having a thick-walled central portion and ends of smaller diameter than the central portion, and a packing-case for said glass having sight openings, in combination with an oil-bowl, an upper and a lower feed-arm on said oil-bowl, means for connecting the packing-case with the lower feed-arm, movable means for connecting the packing-case with the upper feed-arm, and packing-rings or gaskets interposed between the said connecting means, the packing-case, and the glass.

4. In a lubricator, a sight-feed, comprising an observation-glass provided with a longitudinal oil-passage and having a thick-walled central portion and ends of smaller diameter than the central portion, and a packing-case for said glass, in combination with an oil-bowl, an upper and a lower feed-arm on said oil-bowl, means to connect the packing-case with the lower feed-arm, a packing-nut inserted and secured in the packing-case above the glass and movably connected with the upper feed-arm, and packing-rings or gaskets interposed between the lower feed-arm, the glass, the case, and the packing-nut.

5. In a lubricator, an oil-bowl having a pocket next to the lower feed-arm, a strainer arranged in said pocket, an oil-supply pipe opening into the strainer, a plug for supporting the pipe at its bottom and the strainer at its top, and another plug for supporting the strainer at its bottom.

6. A lubricator, having an oil-bowl, upper and lower feed-arms, a sight-feed interposed between these arms, a pocket extending from the bottom of the oil-bowl and receiving the lower feed-arm, a strainer arranged in said pocket, a straight oil-supply pipe extending up above the strainer, and feed-controlling valves in the several feed-arms.

7. A lubricator, having an oil-bowl, upper and lower feed-arms, a sight-feed interposed between these arms, a pocket extending from the bottom of the oil-bowl and receiving the lower feed-arm, a strainer arranged in said pocket, and a straight oil-supply pipe extending up above the strainer.

8. A lubricator, having an oil-bowl, upper and lower feed-arms, a sight-feed interposed between these arms, a pocket extending from the bottom of the oil-bowl and receiving the lower feed-arm, and a strainer arranged in said pocket.

9. In a lubricator, a sight-feed, a lower feed-arm, an upper feed-arm and passages leading to the part to be lubricated and to the sight-feed, combined with a hub in said upper feed-arm interposed between the said passages and the sight-feed and a valve seated in an opening in the hub.

In testimony whereof I have hereunto set my hand this 21st day of August A. D. 1908.

FRANK W. EDWARDS.

Witnesses:
WILLIAM S. FURRY,
GEORGE M. DICKSON.

---

Copies of this patent may be obtained for five cents each, by addressing the "Commissioner of Patents, Washington, D. C."

Correction in Letters Patent No. 1,032,662.

It is hereby certified that in Letters Patent No. 1,032,662, granted July 16, 1912, upon the application of Frank W. Edwards, of Logansport, Indiana, for an improvement in "Sight-Feed Condensation Displacement-Lubricators," an error appears in the printed specification requiring correction as follows: Page 4, line 42, for the word "blow" read *flow;* and that the said Letters Patent should be read with this correction therein that the same may conform to the record of the case in the Patent Office.

Signed and sealed this 13th day of August, A. D., 1912.

[SEAL.]

E. B. MOORE,
*Commissioner of Patents.*